(12) United States Patent
Potasek et al.

(10) Patent No.: US 11,099,093 B2
(45) Date of Patent: Aug. 24, 2021

(54) THERMALLY-MATCHED PIEZORESISTIVE ELEMENTS IN BRIDGES

(71) Applicant: Rosemount Aerospace Inc., Burnsville, MN (US)

(72) Inventors: David P. Potasek, Lakeville, MN (US); Roger Alan Backman, Minneapolis, MN (US)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 105 days.

(21) Appl. No.: 16/536,486

(22) Filed: Aug. 9, 2019

(65) Prior Publication Data

US 2021/0041316 A1    Feb. 11, 2021

(51) Int. Cl.
*G01L 19/04* (2006.01)
*G01L 9/00* (2006.01)

(52) U.S. Cl.
CPC .......... *G01L 19/04* (2013.01); *G01L 9/0052* (2013.01)

(58) Field of Classification Search
CPC .............................. G01L 19/04; G01L 9/0052
See application file for complete search history.

(56) References Cited

U.S. PATENT DOCUMENTS

| 4,672,411 A * | 6/1987 | Shimizu | G01L 9/0054 257/419 |
|---|---|---|---|
| 5,017,340 A | 5/1991 | Pribat et al. | |
| 6,329,825 B1 | 12/2001 | Tanaka et al. | |
| 6,724,202 B2 | 4/2004 | Tanizawa | |
| 6,860,153 B2 | 3/2005 | Leung | |
| 7,856,885 B1 | 12/2010 | Bhansali et al. | |
| 7,918,137 B2 | 4/2011 | Kurtz et al. | |
| 2006/0081062 A1 * | 4/2006 | Silverbrook | B60C 23/0408 73/754 |

(Continued)

FOREIGN PATENT DOCUMENTS

| JP | 6170765 A | 4/1986 |
|---|---|---|
| JP | 0425256 U | 2/1992 |

OTHER PUBLICATIONS

Partial European Search Report dated Jul. 17, 2020, received for corresponding European Application No. 19215614.9, 14 pages.

(Continued)

*Primary Examiner* — Francis C Gray
(74) *Attorney, Agent, or Firm* — Kinney & Lange, P.A.

(57) ABSTRACT

A micromechanical pressure sensor for measuring a pressure differential includes a diaphragm having an inner region and two edge regions, one opposite the other with respect to the inner region. Two or more piezoresistive resistance devices are on the diaphragm, at least one in each of the inner and edge region, and are configured to be electrically connected in a bridge circuit. The micromechanical pressure sensor is configured so that an operating temperature of the one or more piezoresistive resistance devices in the inner region is substantially the same as an operating temperature of the one or more piezoresistive resistance devices in at least one of the edge regions throughout a full operating range such that an error of the micromechanical pressure sensor output resulting from self-heating is less than if the micromechanical pressure sensor were not configured to maintain the operating temperatures substantially the same.

18 Claims, 6 Drawing Sheets

(56) References Cited

U.S. PATENT DOCUMENTS

| 2012/0118060 | A1* | 5/2012 | Kimura | G01L 11/002 |
| | | | | 73/384 |
| 2016/0138989 | A1* | 5/2016 | Tanaka | G01L 9/005 |
| | | | | 73/384 |
| 2016/0209285 | A1* | 7/2016 | Nakajima | G01L 19/141 |
| 2020/0370981 | A1* | 11/2020 | Daup | G01L 9/0055 |

OTHER PUBLICATIONS

Extended European Search Report dated Oct. 19, 2020, received for corresponding European Application No. 19215614.9, 12 pages.

* cited by examiner

THERMALLY-MATCHED PIEZORESISTIVE ELEMENTS IN BRIDGES

BACKGROUND

The present application relates to pressure sensors, and more particularly, to aircraft pitot and static pressure sensors having micromechanical piezoresistive elements.

Probes and associated pressure sensors are utilized to determine characteristics of an environment. In aircraft systems, for example, air data probes (e.g., pitot and/or pitot-static probes) can be implemented on the external portions of the aircraft to aid in determination of conditions such as true airspeed, calibrated airspeed, Mach number, altitude, angle of attack, angle of sideslip, or other air data parameters. A typical configuration can utilize a pitot tube external to an aircraft, connected by a pneumatic tube to a micromechanical piezoresistive sensor element. The micromechanical piezoresistive sensor elements can be installed on a pressure diaphragm that is influenced by air pressure communicated via the pneumatic tube. In a typical configuration, four micromechanical piezoresistive resistors are connected in a Wheatstone bridge circuit, thereby producing an electrical signal that is indicative of the sensed pressure.

SUMMARY

A micromechanical pressure sensor includes a diaphragm that is configured to mechanically deform in response to a load applied thereto. The diaphragm has an inner region and two edge regions, one being opposite the other with respect to the inner region. One or more piezoresistive resistance devices is on the diaphragm in the inner region, and one or more piezoresistive resistance devices is on the diaphragm in at least one of the edge regions. The piezoresistive resistance devices are configured to be electrically connected in a bridge circuit. The micromechanical pressure sensor is configured so that an operating temperature of the one or more piezoresistive resistance devices in the inner region is substantially the same as an operating temperature of the one or more piezoresistive resistance devices in at least one of the edge regions throughout a full operating range such that an error of the micromechanical pressure sensor output resulting from self-heating is less than if the micromechanical pressure sensor were not configured to maintain the operating temperatures substantially the same.

A method for using a micromechanical pressure sensor to measure a pressure differential across a diaphragm that is configured to mechanically deform in response to a load applied by the pressure differential is also disclosed. The diaphragm has an inner region and two edge regions, one being opposite the other with respect to the inner region. One or more piezoresistive resistance devices is on the diaphragm in the inner region, and one or more piezoresistive resistance devices is on the diaphragm in at least one of the edge regions. The piezoresistive resistance devices are configured to be electrically connected in a bridge circuit. The method includes applying a supply voltage to the bridge circuit that is configured to produce an electrical output voltage, measuring the electrical output voltage, and producing a signal representative of the pressure differential based on the measured electrical output voltage. The micromechanical pressure sensor is configured so that an operating temperature of the one or more piezoresistive resistance devices in the inner region is substantially the same as an operating temperature of the one or more piezoresistive resistance devices in at least one of the edge regions throughout a full operating range such that an error of the micromechanical pressure sensor output resulting from self-heating is less than if the micromechanical pressure sensor were not configured to maintain the operating temperatures substantially the same.

DETAILED DESCRIPTION

Figure 1A:
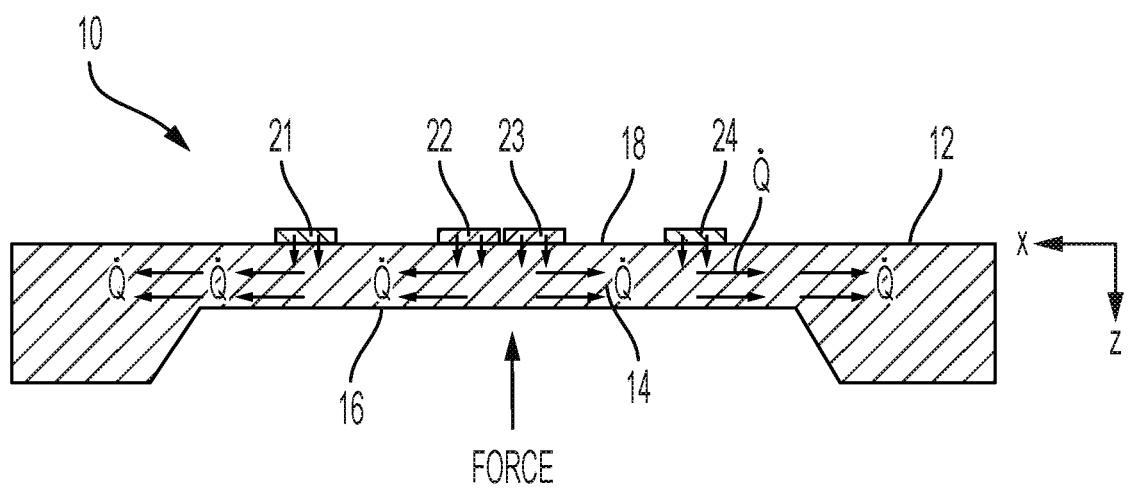
FIG. 1A is a side view of a piezoresistive pressure sensor of the prior art.

FIG. 1A is a side view of a piezoresistive pressure sensor of the prior art. Shown in FIG. 1 are piezoresistive pressure sensor 10, sensor body 12, diaphragm 14, pressure surface 16, resistor surface 18, first resistor 21, second resistor 22, third resistor 23, and fourth resistor 24. Piezoresistive pressure sensor 10 includes sensor body 12 and can be located within an enclosure (not shown). Diaphragm 14 includes pressure surface 16 and resistor surface 18. A pressure to be sensed, when applied to diaphragm 14, applies a force to pressure surface 16. Resistor surface 18 is on the opposite side of diaphragm 14 from pressure surface 16 and includes an arrangement of four piezoresistors, first resistor 21, second resistor 22, third resistor 23, and fourth resistor 24, each of which has a resistance value that varies in response to an induced mechanical strain caused by force acting on diaphragm 14. First, second, third, and fourth resistors 21, 22, 23, and 24 are substantially similar in physical shape and size, and can be arranged in a Wheatstone bridge circuit (not shown in FIG. 1A) to produce an electrical signal that is indicative of the sensed pressure. Air data systems that employ piezoresistive pressure sensor 10, including first, second, third, and fourth resistors 21, 22, 23, and 24, are known to those who are skilled in the pressure-sensing art. During operation of piezoresistive pressure sensor 10, first, second, third, and fourth resistors 21, 22, 23, and 24 conduct electrical current while configured in a Wheatstone bridge circuit for sensing a pressure that is applied to piezoresistive pressure sensor 10. Current flowing through first, second, third, and fourth resistors 21, 22, 23, and 24 results in power dissipation in each, resulting in a temperature increase over that of sensor body 12. This can be described as a self-heating effect, which drives heat flow Q̇ from first, second, third, and fourth resistors 21, 22, 23, and 24 downward (i.e., in the direction of the z-axis as shown in FIG. 1A) and toward sensor body 12 (i.e., outward, as shown in FIG. 1A). Sensor body 12 is the heat sink for heat flow Q̇ from first, second, third, and fourth resistors 21, 22, 23, and 24. Current flow through a resistor is driven by the voltage across the resistor, resulting in a power dissipation that can be calculated by equation 1, where Voltage is the voltage across the resistor and Resistance is the electrical resistance value of the resistor.

$$\text{Power} = \frac{\text{Voltage}^2}{\text{Resistance}} \qquad \text{Equation 1}$$

Figure 1B:
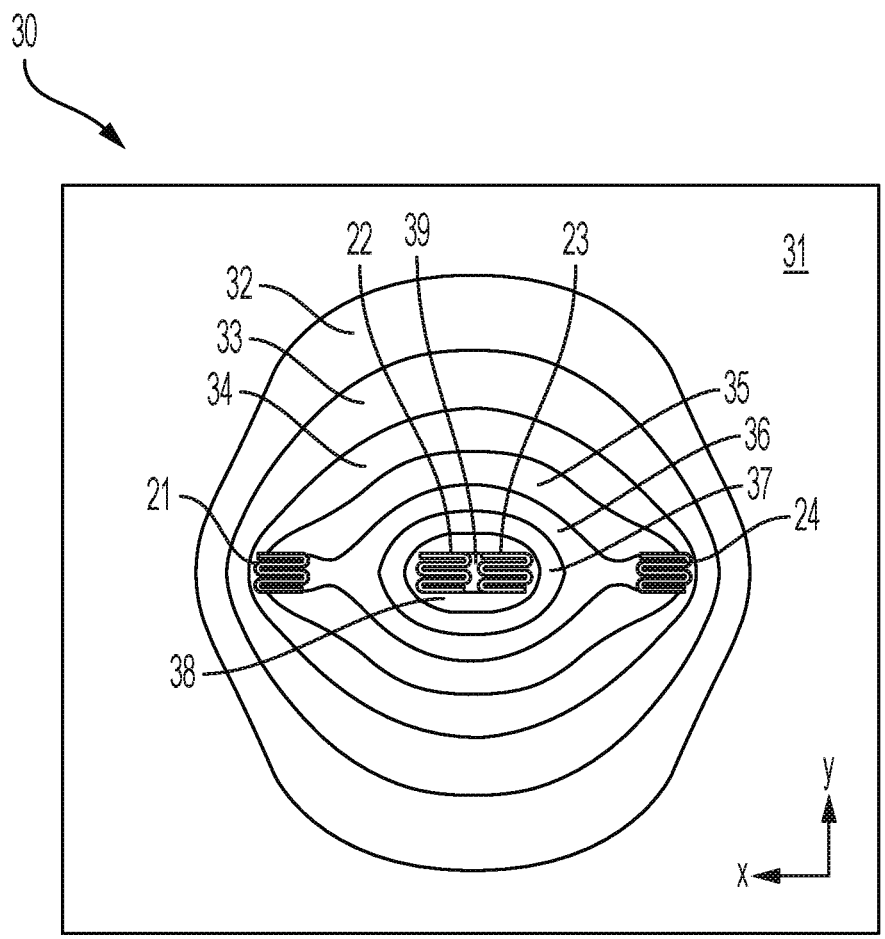
FIG. 1B is a graph showing temperature gradients superimposed on a top view of the piezoresistive pressure sensor shown in FIG. 1A.

FIG. 1B is a graph showing temperature iso-contours superimposed on a top view of piezoresistive pressure sensor 10 shown in FIG. 1A. Shown in FIG. 1B are first resistor 21, second resistor 22, third resistor 23, fourth resistor 24, thermal graph 30, first thermal region 31, second thermal region 32, third thermal region 33, fourth thermal region 34, fifth thermal region 35, sixth thermal region 36, seventh thermal region 37, eighth thermal region 38, and ninth thermal region 39. First, second, third, and fourth resistors 21, 22, 23, and 24 each have a serpentine shape when viewed from the top. The serpentine shape of piezoresistive elements used in piezoresistive pressure sensors is known to those who are skilled in the pressure-sensing art. Thermal graph 30 shows a thermal gradient profile across piezoresistive pressure sensor 10 when first, second, third, and fourth resistors 21, 22, 23, and 24 are conducting electrical current resulting in self-heating, as described above in regard to FIG. 1A. The self-heating by first, second, third, and fourth resistors 21, 22, 23, and 24 establishes equilibrium temperature conditions as depicted in thermal graph 30, with a resulting non-uniform temperature profile across piezoresistive pressure sensor 10. First through ninth thermal regions 31-39 indicate a temperature rise (i.e., relative increase) over the bulk temperature of sensor body 12. Several factors cause the non-uniform temperature profile, including the physical sizes of first, second, third, and fourth resistors 21, 22, 23, and 24, the physical size of sensor body 12, the thermal conductivity of various materials that comprise piezoresistive pressure sensor 10, and so on.

Table 1 provides the following isothermal regions (i.e., isotherms) that are defined by the temperature boundaries shown in thermal graph 30.

TABLE 1

| Thermal region | Minimum temperature rise (deg. C.) | Maximum temperature rise (deg. C.) |
|---|---|---|
| first thermal region 31 | 0 C. | 0.16 C. |
| second thermal region 32 | 0.16 C. | 0.33 C. |
| third thermal region 33 | 0.33 C. | 0.49 C. |
| fourth thermal region 34 | 0.49 C. | 0.66 C. |
| fifth thermal region 35 | 0.66 C. | 0.82 C. |
| sixth thermal region 36 | 0.82 C. | 0.99 C. |
| seventh thermal region 37 | 0.99 C. | 1.15 C. |
| eighth thermal region 38 | 1.15 C. | 1.32 C. |
| ninth thermal region 39 | 1.32 C. | 1.48 C. |

As shown in FIG. 1B, first and fourth resistors 21, 24 are situated near the edge regions of piezoresistive pressure sensor 10 covered by fourth, fifth, and sixth thermal regions 34, 35, 36 (i.e., bounded by temperatures 0.49-0.99 degrees C.), whereas second and third resistors 22, 23 are situated near the inner region of piezoresistive pressure sensor 10 covered by eighth and ninth thermal regions 38, 39 (i.e., bounded by temperatures 1.15-1.48 degrees C.). In the illustrated embodiment, first, second, third, and fourth resistors 21, 22, 23, 24 have a positive temperature coefficient of resistivity. The uneven temperature profile across second and third resistors 22, 23 (i.e., in the central region) compared to the temperature profile across first and fourth resistors 21, 24 (i.e., near the edge regions) results in unbalanced resistances values because of the temperature coefficient of resistivity. This results in a measurement error when first, second, third, and fourth resistors 21, 22, 23, 24 are used in a Wheatstone bridge circuit to provide an indication of the pressure value that is sensed by piezoresistive pressure sensor 10. The temperature values shown in table 1 result from an exemplary embodiment in which the resistance values of first resistor 21, second resistor 22, third resistor 23, and fourth resistor 24 are each 10,000 ohms (Ω). It can be appreciated from equation 1 that smaller resistance values result in an exponentially-larger power dissipation for a given voltage, thereby leading to a greater self-heating effect. Accordingly, larger resistance values (i.e., higher impedance bridge circuit) result in less self-heating, which can be preferable in piezoresistive pressure sensor 10 of the prior art.

Figure 2:
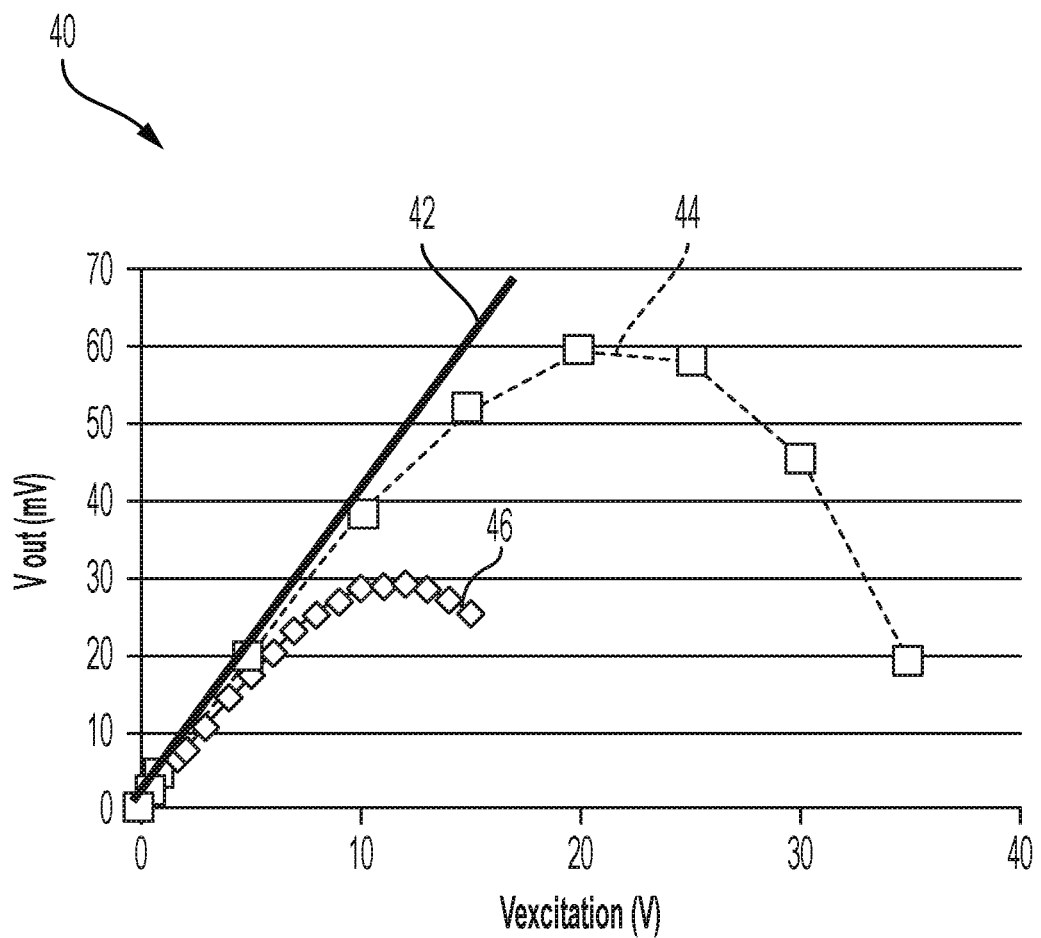
FIG. 2 is a graph showing output voltage as a function in excitation voltage for various resistance values for a Wheatstone bridge using the piezoresistive pressure sensor shown in FIG. 1A.

FIG. 2 is a graph showing output voltage as a function in excitation voltage for various resistance values for a Wheatstone bridge circuit (not shown in FIG. 2) using piezoresistive pressure sensor 10 shown in FIG. 1A. Shown in FIG. 2 are output voltage graph 40, ideal response curve 42, first actual response curve 44, and second actual response curve 46. Ideal response curve 42 shows an idealized response from first, second, third, and fourth resistors 21, 22, 23, 24 in which output voltage ($V_{out}$) increases linearly with excitation voltage ($V_{excitation}$). It can be beneficial to use a higher value of excitation voltage, thereby yielding a higher value of output voltage from the Wheatstone bridge circuit, and thus improving the signal-to-noise ratio (SNR) of the electrical signal that represents the pressure value measured by piezoresistive pressure sensor 10.

First actual response curve 44 represents the output behavior in an embodiment where first, second, third, and fourth resistors 21, 22, 23, 24 each have a resistance value of about 10,000 Ω (i.e., 10 kΩ). As excitation voltage increases from 0 V, output voltage increases but at a decreasing rate (i.e., the slope of first actual response curve 44 is positive but decreasing). Eventually, first actual response curve 44 reaches a maximum value at an excitation voltage of about 20 V. As excitation voltage continues to increase above about 20 V, output voltage decreases at an increasing rate (i.e., the slope of first actual response curve 44 is negative and getting more negative). Second actual response curve 46 represents the output behavior in an embodiment where first, second, third, and fourth resistors 21, 22, 23, 24 each have a resistance value of about 700 Ω. The description of second actual response curve 46 is similar to that provided for first actual response curve 44, second actual response curve 46 reaches a maximum value at an excitation voltage of about 12 V. The response of piezoresistive pressure sensor 10 to excitation voltage, as exemplified by first and second actual response curves 44, 46, is a result of the uneven self-heating of first, second, third, and fourth resistors 21, 22, 23, 24, described above in regard to FIG. 1B. Accordingly, smaller resistance values and/or higher values of excitation voltage can be disadvantageous in piezoresistive pressure sensor 10 of the prior art because of an increased self-heating effect, thereby resulting in greater performance non-linearity.

Figure 3A:
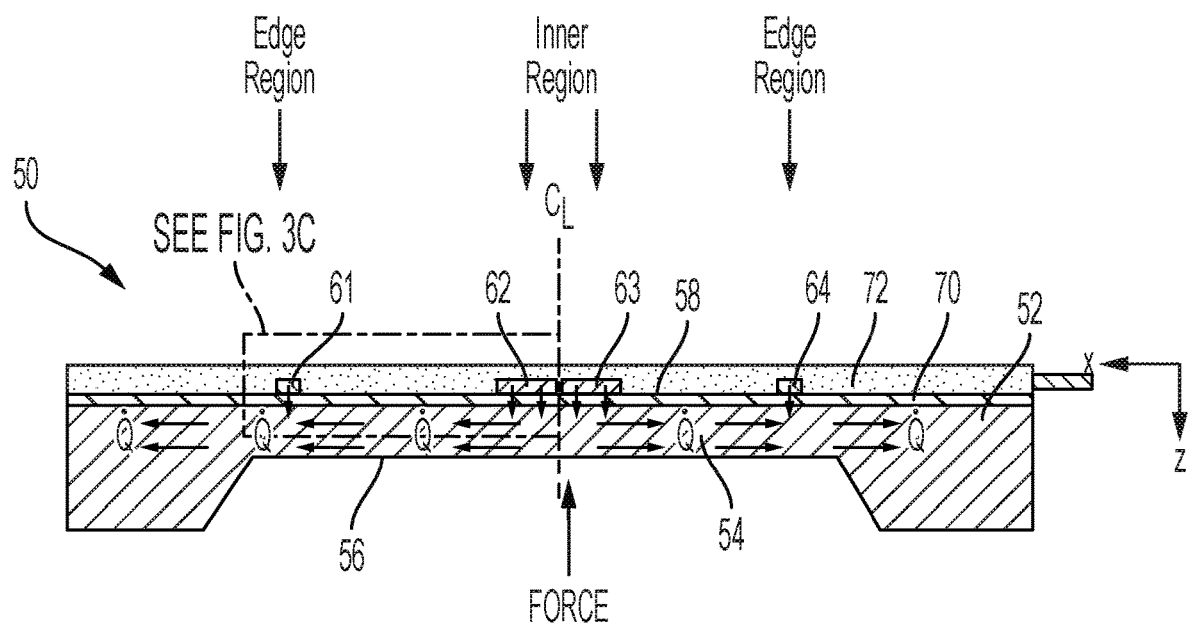
FIG. 3A is a side view of a micromechanical pressure sensor with thermally-matched piezoresistive elements.
Figure 3B:
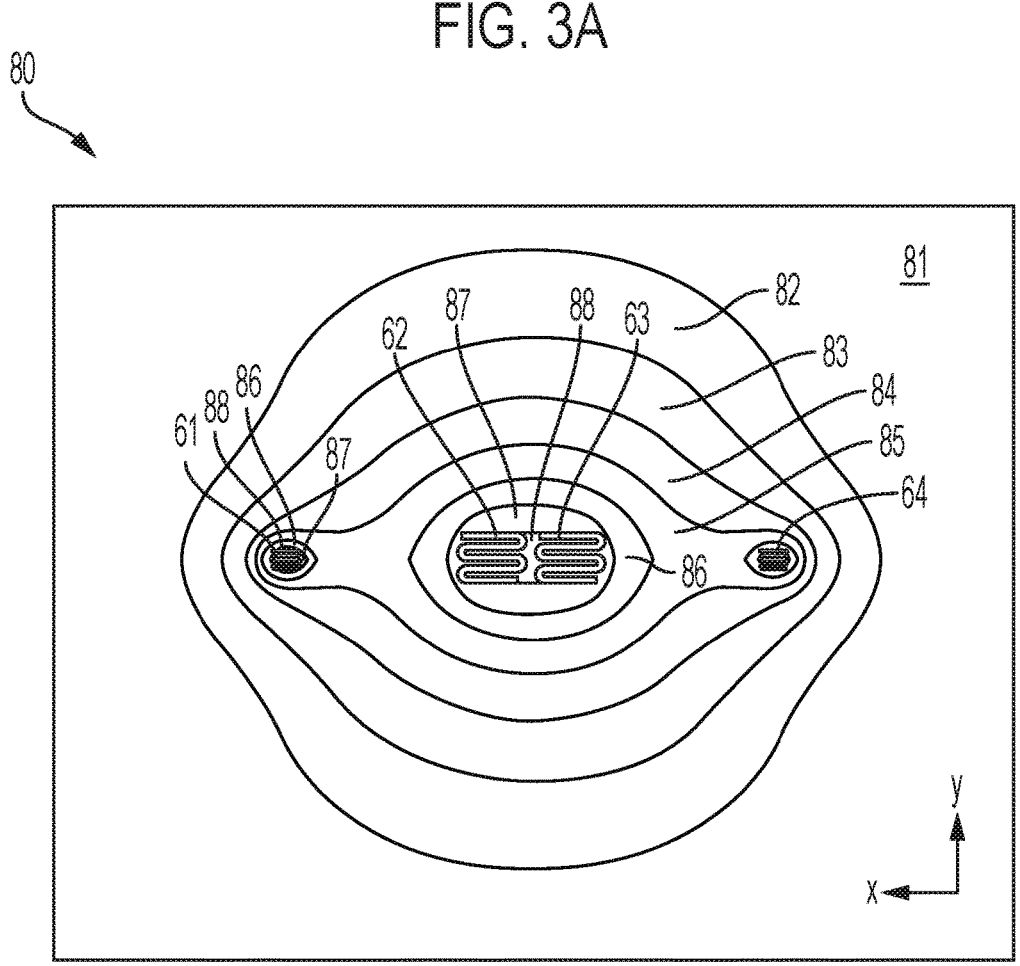
FIG. 3B is a graph showing temperature gradients superimposed on a top view of the micromechanical pressure sensor shown in FIG. 3A.
Figure 3C:
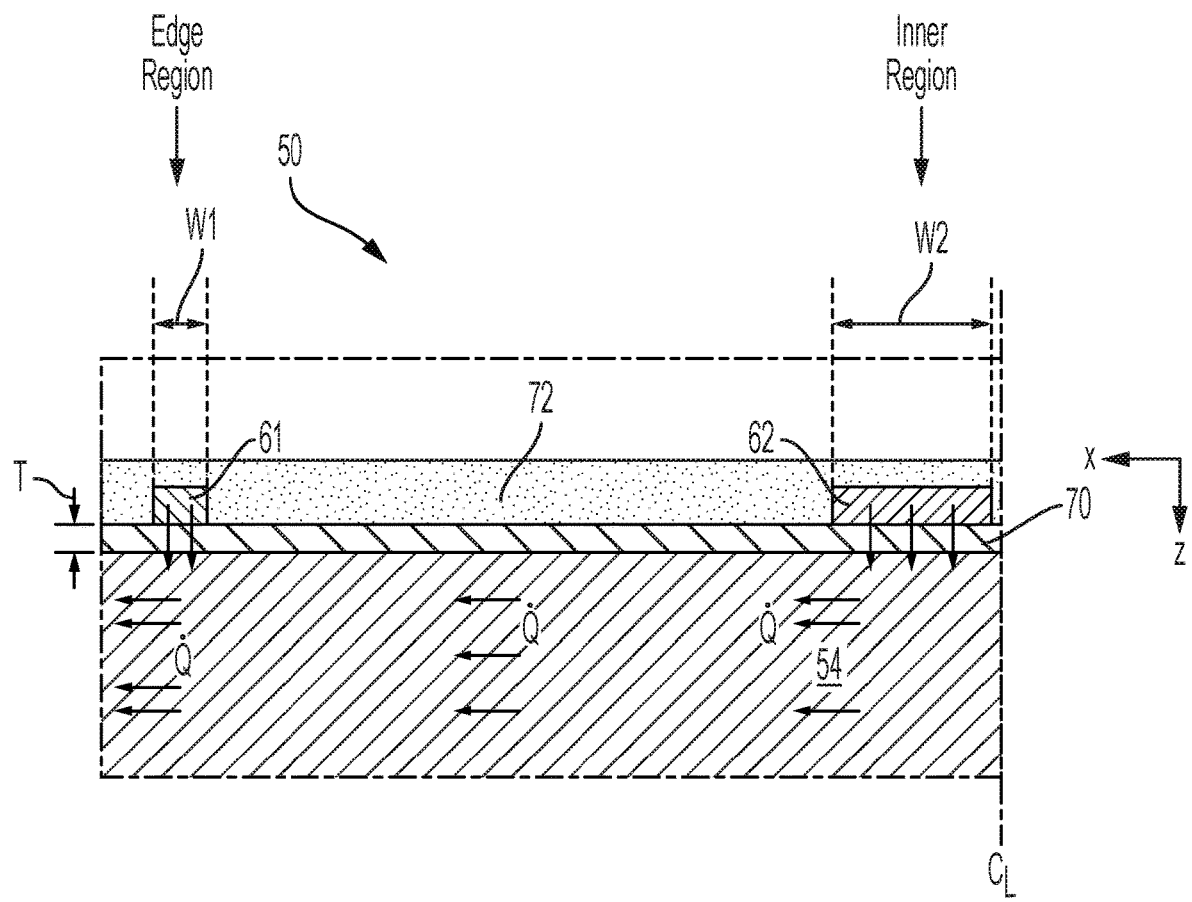
FIG. 3C is an enlarged cross-sectional side view of the micromechanical pressure sensor shown in FIG. 3A.

FIG. 3A is a side view of a micromechanical pressure sensor with thermally-matched piezoresistive elements. FIG. 3B is a graph showing temperature iso-contours superimposed on a top view of the micromechanical pressure sensor shown in FIG. 3A. FIG. 3C is an enlarged cross-sectional side view of the micromechanical pressure sensor shown in FIG. 3A. Shown in FIGS. 3A and 3C are pressure sensor 50, sensor body 52, diaphragm 54, pressure surface 56, resistor surface 58, first resistor 61, second resistor 62, third resistor 63, fourth resistor 64, isolation layer 70, and overcoat 72. Centerline (CL), inner, and edge regions are labeled in FIGS. 3A and 3C. In the illustrated embodiment, pressure sensor 50 is symmetrical about the centerline. First and fourth resistors 61, 64 can be referred to as edge resistors, because they are located near outer edges of diaphragm 54 (i.e., furthest from the centerline). First and fourth resistors 61, 64 can also be referred to as periphery resistors. Second and third resistors 62, 63 can be referred to as inner resistors, because they are located near the inner region (i.e., nearest the centerline). Second and third resistors 62, 63 can also be referred to as center resistors. Edge resistor width W1, inner resistor width W2, and isolation layer thickness T are labeled in FIG. 3C. Heat flow $\dot{Q}$ is also depicted in FIG. 3C. In other embodiments, pressure sensor 50 can be asymmetrical about the center line. In some of these embodiments, pressure sensor 50 can include fewer than four piezoresistive elements. In an exemplary alternative embodiment, pressure sensor 50 can include first resistor 61 (i.e., an edge resistor) and second resistor 62 (i.e., an inner resistor).

Referring again to FIG. 3A, pressure sensor 50 can be located within an enclosure (not shown) that is arranged to subject diaphragm 54 to a pressure source that is to be sensed. For example, the pressure source can be a pitot tube (not shown) located external to an aircraft (not shown), with the pressure source being communicated to sensor body 52 by a pneumatic tube (not shown). This can be referred to as a dynamic pressure. The dynamic pressure is directed to pressure surface 56, applying a force to diaphragm 54, thereby causing diaphragm 54 to deflect in response to the dynamic pressure. The force can also be referred to as a load. In the illustrated embodiment, the dynamic pressure is an absolute pressure, whereby pressure communicated by a single pneumatic tube acts on only one surface of diaphragm 54. Resistor surface 58 is on the opposite side of diaphragm 54 from pressure surface 56. The deflection of diaphragm 54 induces a mechanical strain in resistor surface 58. First resistor 61, second resistor 62, third resistor 63, and fourth resistor 64 are piezoresistive resistors, the resistance (i.e., electrical resistance) of each of which varies in response to the induced mechanical strain. Pressure sensor 50 can be also be referred to as a micromechanical pressure sensor, a micromechanical electrical system (MEMS) pressure sensor, a piezoresistive pressure sensor, or a pressure cell. During operation of pressure sensor 50, the application of the dynamic pressure to diaphragm 54 causes the resistance of first resistor 61, second resistor 62, third resistor 63, and fourth resistor 64 to each vary in response to the system pressure, thereby causing the force exerted on diaphragm 54 to vary. First, second, third, and fourth resistors 61, 62, 63, 64 are arranged in a Wheatstone bridge circuit, as will be shown later in FIG. 4. During operation of pressure sensor 50, heat flow $\dot{Q}$ from self-heating of first, second, third, and fourth resistors 61, 62, 63, and 64 flows in the z-axis direction across isolation layer 70, then outward to sensor body 52, as shown in FIG. 3A. Sensor body 52 is the heat sink for heat flow $\dot{Q}$ from first, second, third, and fourth resistors 61, 62, 63, and 64. In the illustrated embodiment, the pressure to be sensed (i.e., a system pressure) is applied to pressure surface 56 of pressure sensor 50, with the system pressure being measured as an absolute pressure (i.e., with respect to a vacuum). In some embodiments, the system pressure can be applied to resistor surface 58 of pressure sensor 50. In any of these embodiments, the pressure to be sensed can be a gage pressure (i.e., relative to atmospheric pressure). Pressure sensor 50 can be used in various embodiments to measure a wide range of pressure values, ranging from 0-1,000 psi (0-6,895 KPa), or higher. As a non-limiting example, pressure sensor 50 can be used to sense pressure in a compression stage of a gas turbine engine. In other embodiments, a differential pressure can be applied between pressure surface 56 and resistor surface 58. In these other embodiments, the high side of the differential pressure to be sensed can be applied to either pressure surface 56 or resistor surface 58. In some of these embodiments, pressure sensor 50 can be configured to measure a relatively small differential pressure (e.g., less than about 1 psid (6.9 KPa differential)).

Isolation layer 70 covers diaphragm 54, thereby providing electrical and thermal isolation of first, second, third, and fourth resistors 61, 62, 63, 64 from diaphragm 54. Isolation layer 70 can also be referred to as an insulating layer, or as an insulator. In the illustrated embodiment, isolation layer 70 is made of silicon dioxide (i.e., silicon oxide). In other embodiments, isolation layer 70 can be silicon nitride, aluminum oxide, polyimide, or combinations of one or more of the aforementioned materials, or any other dielectric material that provides thermal isolation. In the illustrated embodiment, isolation layer thickness T is about 0.5 μm (microns). In some embodiments, isolation layer thickness T can range from about 0.1-1 μm. In other embodiments, isolation layer thickness T can be less than 0.1 μm or greater than 1 μm. As will be described later in regard to equations 2-8, the thermal-matching of first, second, third, and fourth resistors 61, 62, 63, 64 is a result, in part, of the heat flow $\dot{Q}$ from each piezoresistive element through isolation layer 70 into diaphragm 54 and sensor body 54. Isolation layer thickness T directly affects heat flow $\dot{Q}$ from first, second, third, and fourth resistors 61, 62, 63, 64. Therefore, isolation layer thickness T can be established for a particular material used for isolation layer 70 to help in providing thermal matching. In some embodiments, isolation layer thickness T can range from about 0.1-5 μm. Overcoat 72 forms a conformal protective layer over first, second, third, and fourth resistors 61, 62, 63, 64 to provide electrical isolation and/or protection. Overcoat 72 can also be called a conformal coating or a protective coating. In the illustrated embodiment, overcoat 72 can be a combination of silicon oxide and silicon nitride. In some embodiments, overcoat 72 can be parylene, aluminum oxide, polyimide, or combinations of one or more of the aforementioned materials, or any other dielectric material that provides encapsulation. As will be described in greater detail later in FIG. 4, the electrical resistance values of first, second, third, and fourth resistors 61, 62, 63, 64 are all about the same, and can range from about 100-50,000 Ω (ohms). In an exemplary embodiment, first, second, third, and fourth resistors 61, 62, 63, 64 can each have a resistance value of about 10,000 Ω (i.e., 10 kΩ). In another exemplary embodiment, first, second, third, and fourth resistors 61, 62, 63, 64 can each have a resistance value of about 700 Ω. As used in the present disclosure, the Wheatstone bridge resistors can be said to have resistance values that are about the same when the resistance of any resistor is within 10% of a specified resistance value (i.e., ±10%, meaning that no resistor has a resistance value that is more than about 20% of any other). This can be referred to as a resistance value tolerance. In some embodiments, the resistance value tolerance can be smaller (i.e., tighter). In exemplary embodiments, the resistance value tolerance can be ±5% or ±2%.

Referring next to FIG. 3B, a graph showing temperature gradients superimposed on a top view of the micromechanical pressure sensor shown in FIG. 3A. Shown in FIG. 3B are thermal graph 80, first thermal region 81, second thermal region 82, third thermal region 83, fourth thermal region 84, fifth thermal region 85, sixth thermal region 86, seventh thermal region 87, and eighth thermal region 88. Thermal graph 80 shows a thermal gradient profile across pressure sensor 50 when first, second, third, and fourth resistors 61, 62, 63, and 64 are conducting electrical current while configured in a Wheatstone bridge circuit for sensing a pressure that is applied to pressure sensor 50. Accordingly, first, second, third, and fourth resistors 61, 62, 63, and 64 can be referred to as the Wheatstone bridge resistors, the bridge resistors, the Wheatstone bridge piezoresistive resistors, or the Wheatstone bridge piezoresistance devices. Current flowing through the Wheatstone bridge resistors (i.e., first, second, third, and fourth resistors 61, 62, 63, and 64) results in power dissipation by each, which can cause a self-heating effect that can result in a temperature increase in the Wheatstone bridge resistors. In the illustrated embodiment, the Wheatstone bridge resistors each have a serpentine shape when viewed from the top, which provides a greater change in resistance value in response to an applied force, thereby improving the sensitivity of pressure sensor 50. An advantage to using a serpentine pattern is the compactness of the piezoresistive material in a relatively small surface area, thereby resulting in a much greater change in resistance in response to an induced stress as opposed to a non-serpentine pattern. Accordingly, a serpentine pattern can provide a relatively high sensitivity when relatively small pressures are measured. The line widths (not labeled) of serpentine-patterned Wheatstone bridge resistors is smaller in first and fourth resistors 61, 64 (i.e., edge resistors) as compared to second and third resistors 62, 63 (i.e., inner resistors), but the gap distance between the serpentine traces (not labeled) remains the same, thereby reducing the overall footprint of the serpentine pattern in the edge resistors (i.e., as compared to the inner resistors). As noted above, the resistance values of first, second, third, and fourth resistors 61, 62, 63, 64 are all about the same. Therefore, the electrical power dissipated by each resistor is about the same (i.e., as given by equation 1). Accordingly, the surface power density (i.e., power per unit area) is greater for the edge resistors than for the inner resistors. The greater surface power density across the footprint of the edge resistors overcomes the greater heat loss from the edge resistors (i.e., as compared to the inner resistors), thereby thermally balancing the edge resistors and the inner resistors, as will be described. As noted earlier, first, second, third, and fourth resistors 61, 62, 63, 64 have a serpentine pattern in the illustrated embodiment. In other embodiments, first, second, third, and/or fourth resistors 61, 62, 63, and 64 can have patterns (i.e., shapes, designs) that are different from that depicted in FIG. 3B. In some embodiments, pressure sensor 50 can include more than or fewer than four piezoresistive elements. In a first exemplary embodiment, pressure sensor 50 can include multiple (i.e., redundant) piezoresistive elements. In a second exemplary embodiment, pressure sensor 50 can include two piezoresistive elements that can be connected in a half-bridge. The present disclosure is directed at thermally-matched piezoresistive elements in any electrical bridge configuration.

Referring again to FIG. 3B, table 2 provides the following thermal regions that are defined by the temperature boundaries shown in thermal graph 80. Temperatures are in degrees Celsius (C), and indicate the temperature rise (i.e., relative temperature increase) over the bulk temperature of sensor body 52.

TABLE 2

| Thermal region | Minimum temperature rise (deg. C.) | Maximum temperature rise (deg. C.) |
| --- | --- | --- |
| first thermal region 81 | 0 C. | 0.18 C. |
| second thermal region 82 | 0.18 C. | 0.36 C. |
| third thermal region 83 | 0.36 C. | 0.54 C. |
| fourth thermal region 84 | 0.54 C. | 0.71 C. |
| fifth thermal region 85 | 0.71 C. | 0.89 C. |
| sixth thermal region 86 | 0.89 C. | 1.07 C. |
| seventh thermal region 87 | 1.07 C. | 1.25 C. |
| eighth thermal region 88 | 1.25 C. | 1.43 C. |

Attention is to be made to first and fourth resistors 61, 64 (i.e., edge resistors) being located in seventh and eighth isotherms 87, 88, and to second and third resistors 62, 63 (i.e., inner resistors) also being located in seventh and eighth isotherms 87, 88. Accordingly, all four Wheatstone bridge resistors have an operating temperature that is about the same (i.e., both in thermal regions that are 1.07-1.43 degrees C. higher than the temperature of sensor body 52). From the foregoing analysis, the temperature midpoint of each of first, second, third, and fourth resistors 61, 62, 63, 64 is about 1.25 degree C. above that of sensor body 52, and all regions of first, second, third, and fourth resistors 61, 62, 63, 64 are within ±0.18 degree C. of each other. This can be referred to as the bridge resistors being thermally-matched (i.e., thermal matching of Wheatstone bridge resistors), which can eliminate the measurement inaccuracy that is caused by an uneven temperature rise in the Wheatstone bridge resistors. Wheatstone bridge resistors can be said to as being thermally-matched when they have substantially the same temperature as each other throughout a full operating voltage range such that an error of pressure sensor 50 output resulting from self-heating is less than if pressure sensor 50 were not configured to maintain the operating temperatures substantially the same. In the illustrated embodiment, all Wheatstone bridge resistor temperatures can be said to be within ±0.2 degree C. of each other (i.e., no resistor has a temperature that is more than 0.4 degree C. from that of any other). In some embodiments, all Wheatstone bridge resistor (i.e., bridge resistor) temperatures can within a different temperature value of each other, with the operating temperature difference being either less than (i.e., tighter than) or greater than (i.e., looser than) ±0.2 degree C.

As described above in regard to FIGS. 3A-3B, the electrical resistance values of first, second, third, and fourth resistors 61, 62, 63, 64 are all about the same, and can range from about 100-50,000 Ω (ohms). In an exemplary embodiment, first, second, third, and fourth resistors 61, 62, 63, 64 can each have a resistance value of about 10,000 Ω (i.e., 10 kΩ). In some embodiments, first, second, third, and fourth resistors 61, 62, 63, 64 can each have a resistance value that is less than about 2,000 Ω (i.e., 2 kΩ). In another exemplary embodiment, first, second, third, and fourth resistors 61, 62, 63, 64 can each have a resistance value of about 700 Ω. An advantage of the present disclosure is to provide thermal matching of the Wheatstone bridge piezoresistance devices across all resistance values. Accordingly, resistance values less than about 2 kΩ can be used in pressure sensor 50 of the present disclosure, whereas similar resistance values had disadvantages in piezoresistive pressure sensor 10 of the prior art, as described above in regard to FIG. 2.

The following equations can be used to model the electrical and thermal behavior of the Wheatstone bridge resistors (i.e., first, second, third, and fourth resistors 61, 62, 63, 64). Power dissipation in a resistor is calculated by equation 1, as noted earlier. The temperature rise (ΔT) across a thermal insulator is calculated by equation 2, where Power is the internal power dissipation in an element (i.e., power dissipation, resistive heating), area is the planar area of the heat-producing resistor over the insulator, thickness is the thickness of the insulator, and conductivity is the thermal conductivity of the thermal insulator. Thermal power can also be referred to as heat flow $\dot{Q}$ (i.e., the rate of delivering thermal energy). Equation 2 can be used to describe heat conduction primarily in one dimension, such as heat flowing across isolation layer 70 from first, second, third, and fourth resistors 61, 62, 63, 64 into diaphragm 54, as shown in FIG. 3A.

$$\Delta T = \left(\frac{\text{Power}}{\text{area}}\right)\left(\frac{\text{length}}{\text{conductvity}}\right) \quad \text{Equation 2}$$

As used herein, "thermal insulator" refers to a material that conducts heat poorly, but it is to be understood that unlike electrical insulators which can be modeled as being perfect electrical insulators, most thermal insulators have an appreciable value of thermal conductivity. Accordingly, the temperature rise (ΔT) across a thermal insulator (i.e., temperature gradient) is driven by the heat flux $\dot{Q}''$ (i.e., thermal power $\dot{Q}$ per unit area) being conducted through the thermal insulator. Exemplary thermal insulators that can be used as materials in isolation layer 70 are provided in table 3.

TABLE 3

| Isolation layer material | Thermal conductivity (W/m/K) |
|---|---|
| Silicon | 149 |
| Aluminum oxide | 27 |
| Silicon nitride | 25 |
| Silicone oxide | 1.4 |
| Polyimide | 0.12 |

In general, the temperature rise of first, second, third, and fourth resistors 61, 62, 63, 64 ($\Delta T_{resistor}$) with respect to the reference (i.e., sensor body 52) can be calculated by equation 3, where the thin film insulator is an electrical insulator. An electrical insulator (i.e., insulator) conducts heat, thereby having a thermal conductivity (i.e., insulator conductivity).

$\Delta T_{resistor}$=temperature rise across thin film insultor+
temperature rise across diaphragm substrate  Equation 3

Accordingly, the temperature rise of an edge resistor ($\Delta T_{edge}$) (i.e., first or fourth resistor 61, 64) is calculated by equation 4. There is no temperature rise across the substrate because the reference is at the edge (i.e., edge of sensor body 52).

$$\Delta T_{edge} = \left(\frac{\text{Power}}{\text{edge resistor area}}\right)\left(\frac{\text{insulator thickness}}{\text{insulator } conductvity}\right) \quad \text{Equation 4}$$

The temperature rise of an inner resistor ($\Delta T_{inner}$) (i.e., second or third resistor 62, 63) is calculated by equation 5. This includes the additional temperature rise from diaphragm 54.

$$\Delta T_{inner} = \left(\frac{\text{Power}}{\text{inner } resitor \text{ area}}\right)\left(\frac{\text{insulator thickness}}{\text{insulator } conductvity}\right) + \quad \text{Equation 5}$$
$$\left(\frac{\text{Power}}{\text{diaphragm thickness} * \text{effective diaphragm width}}\right)$$
$$\left(\frac{\text{effective diaphragm length}}{\text{diaphragm } conductvity}\right)$$

Note that effective diaphragm length (not labeled) and effective diaphragm width (not labeled) are used to depict the physical dimensions of diaphragm 54 through the equation development. Effective length and width can incorporate correction factors in the model to provide more accurate results than using actual length and width, a discussion that is outside the scope of the present disclosure. As will be seen, the dimensions of effective length and effective width fall out of the equations. When the Wheatstone bridge resistors are thermally balanced, the temperature rise of the inner resistors ($\Delta T_{inner}$) will be the same as the temperature rise of an edge resistor ($\Delta T_{edge}$), as shown in equation 6.

$$\Delta T_{inner} = \Delta T_{edge} \quad \text{Equation 6}$$

Accordingly, this can be expanded to equation 7 as follows.

$$\left(\frac{\text{Power}}{\text{center } resitor \text{ area}}\right)\left(\frac{\text{insulator thickness}}{\text{insulator } conductvity}\right) + \left(\frac{\text{Power}}{\text{diaphragm thickness} * \text{effective diaphragm width}}\right)\left(\frac{\text{effective diaphragm length}}{\text{diaphragm } conductvity}\right) = \left(\frac{\text{Power}}{\text{edge resistor area}}\right)\left(\frac{\text{insulator thickness}}{\text{insulator } conductvity}\right) \quad \text{Equation 7}$$

The Power terms cancel each other throughout equation 7, meaning that balanced thermal conditions exist regardless of the value of Power dissipated in the resistors. Referring back to equation 1, showing that Power varies with the square of voltage across a resistor, balanced thermal conditions exist regardless of the voltage across the resistors. Accordingly, the temperature rise of the Wheatstone bridge resistors (i.e., $\Delta T_{edge}$ and $\Delta T_{inner}$) is independent of the voltage across each of the resistors in the Wheatstone bridge circuit.

Referring to equation 7, the term $$\left(\frac{\text{insulator thickness}}{\text{insulator conductivity}}\right)$$

can be referred to as a thermal resistance value, as given in equation 8.

$$\text{Insulator thermal resistance} = \left(\frac{\text{insulator thickness}}{\text{insulator conductivity}}\right) \quad \text{Equation 8}$$

Larger values of insulator thermal resistance can be desirable in some embodiments, with larger values of insulator thermal resistance being achieved by larger values of insulator thickness and/or smaller values of insulator conductivity (i.e., insulator thermal conductivity). In an exemplary embodiment, silicon dioxide (i.e., silicon oxide) can be used as an insulator material because of its relatively low value of thermal conductivity, as shown in table 3 (i.e., a thermal conductivity of about 1.4 W/m/K).

A ratio of the planar areas of an edge resistor (i.e., first, fourth resistor 61, 64) to that of an inner resistor (i.e., second, third resistor 62, 63) can be provided as in equation 9.

$$\frac{\text{edge resistor area}}{\text{inner resistor area}} = \frac{\left(\frac{\text{insulator thickness}}{\text{insulator conductivity}}\right)}{\left(\frac{\text{insulator thickness}}{\text{insulator conductivity}}\right) + \frac{\text{center resistor area}}{\text{draphragm thickness} * \text{effective draphragm width}}\left(\frac{\text{effective draphragm length}}{\text{draphragm } conductvity}\right)} \quad \text{Equation 9}$$

To achieve thermal matching in the Wheatstone bridge resistors, it is necessary that the ratio of $$\left(\frac{\text{edge resistor area}}{\text{inner resistor area}}\right)$$

be less than 1, as described above for the illustrated embodiment. Accordingly, in the illustrated embodiment, each of the Wheatstone bridge resistors (i.e., first, second, third, and fourth resistors 61, 62, 63, 64) will be laid-out to have the same number of squares (SQ). The concept of squares is known to those skilled in the sheet resistance art, as described herein in equations 10-12.

$$\text{Resistance} = \frac{\text{resistivity} * \text{length}}{\text{thickness} * \text{width}} \quad \text{Equation 10}$$

For films (i.e., sheets) of constant thickness, the term sheet resistance is defined.

$$\text{Sheet Resistance} = R_S = \frac{\text{resistivity}}{\text{thickness}} \quad \text{Equation 11}$$

Resistance can be expressed in terms of sheet resistance (i.e., film properties), and squares can be used to describe the layout geometry.

$$\text{Squares} = SQ = \frac{\text{length}}{\text{width}} \quad \text{Equation 12}$$

Therefore, equation 12 can be re-written as follows, in equation 13.

$$\frac{\text{edge resistor area}}{\text{inner resistor area}} = \frac{\text{squares} * (\text{edge resistor width})^2}{\text{squares} * (\text{inner resistor width})^2} \quad \text{Equation 13}$$

Accordingly, a ratio of the resistor widths can be provided as in equation 14.

$$\frac{\text{edge resistor width}}{\text{inner resistor width}} = \sqrt{\frac{\left(\frac{\text{insulator thickness}}{\text{insulator conductivity}}\right)}{\left(\frac{\text{insulator thickness}}{\text{insulator conductivity}}\right) + \frac{\text{inner resistor area}}{\text{draphragm thickness} * \text{effective draphragm width}}\left(\frac{\text{effective draphragm length}}{\text{draphragm conductvity}}\right)}}$$

Equation 14

The term $$\left(\frac{\text{edge resistor area}}{\text{inner resistor area}}\right)$$

can be referred to as the resistor width ratio, and can be expressed as shown in equation 15.

$$\text{Resistor width ratio} = \frac{\text{edge resistor width}}{\text{inner resistor width}} \qquad \text{Equation 15}$$

In the exemplary embodiment shown in FIG. 3C, the resistor width ratio is about 0.4. Several factors can be used to determine the size ratio in a particular embodiment, with exemplary factors being the particular geometries of the Wheatstone bridge resistors (i.e., first, second, third, fourth resistors 61, 62, 63, 64), the material used for the thermal insulator (i.e., isolation layer 70), the thickness of the thermal insulator (i.e., isolation layer thickness T), and the geometry of, and materials used for, diaphragm 54 and/or sensor body 52. In some embodiments, the resistor width ratio can range from about 0.3-0.6. In other embodiments, the resistor width ratio can range from about 0.1-0.95. In yet other embodiments, the resistor width ratio can be less than 0.1 or greater than 0.95 (i.e., 0.95-0.999).

Figure 4:
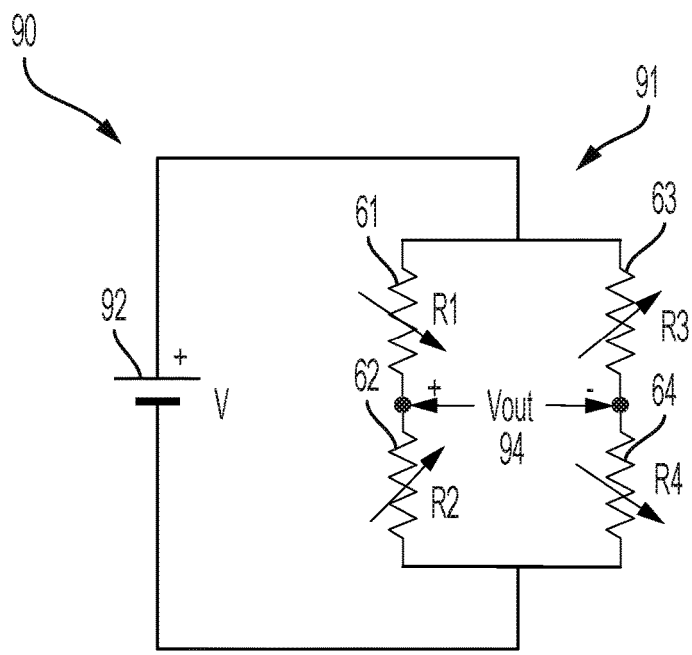
FIG. 4 is an electrical schematic diagram of a Wheatstone bridge circuit for the micromechanical pressure sensor shown in FIG. 3A.

FIG. 4 is an electrical schematic diagram of a Wheatstone bridge circuit for the micromechanical pressure sensor shown in FIG. 3A. Shown in FIG. 4 are bridge circuit 90, Wheatstone bridge 91. Voltage supply 92, and output voltage 94. First, second, third, and fourth resistors 61, 62, 63, 64 (i.e., R1, R2, R3, and R4, respectively) are electrically arranged in Wheatstone bridge 91. Voltage supply 92 can be referred to as the excitation voltage ($V_{excitation}$). Voltage V from voltage supply 92 is applied across Wheatstone bridge 91, thereby producing an output voltage ($V_{out}$) 94 as indicated. During operation of pressure sensor 50, output voltage 94 is representative of the pressure being sensed by pressure sensor 50. In a typical embodiment, output voltage 94 can be amplified, filtered, and converted to a digital signal by an analog-to-digital converter (ADC) before being transmitted to systems. In an exemplary embodiment, voltage supply 92 can have a value of about 10 volts. In some embodiments, voltage supply 92 can range from about 5-25 volts. In other embodiments, voltage supply 92 can range from about 3-50 volts. In another exemplary embodiment, voltage supply 92 can range from about 3-10 volts. In other embodiments, voltage supply 92 can be less than 3 volts. In some of these embodiments, voltage supply 92 can be as small as 0.1 volt. In yet other embodiments, voltage supply 92 can be greater than 50 volts. In another exemplary embodiment, voltage supply 92 can range from about 0.1-100 volts. In some embodiments, voltage supply 92 can range to about 1,000 volts, or greater. All values of voltage for voltage supply 92 are within the scope of the present disclosure. It is to be appreciated, as described above, that the present disclosure is immune to the value of power dissipated by each of the Wheatstone bridge resistors, and therefore, to the value of voltage supplied by voltage supply 92. The range of possible values of voltage supply 92 in a particular embodiment can be referred to as the operating range. Accordingly, in an exemplary embodiment, the operating range is about 0.1-100 volts. As noted earlier, pressure sensor 50 is configured so that the operating temperature of the bridge resistors is substantially the same as each other throughout a full operating voltage range such that an error of pressure sensor 50 output resulting from self-heating is less than if pressure sensor 50 were not configured to maintain the operating temperatures substantially the same. The error can be defined as the difference between the actual sensor output at a particular operating voltage and an ideal sensor output at that same operating voltage (e.g., ideal response curve 42 as shown in FIG. 2).

Referring back to FIGS. 3A-3C, reference was made to the voltage across a particular resistor. Referring to bridge circuit 90 in FIG. 4, in which the resistance values of R1-R4 (i.e., first, second, third, and fourth resistors 61, 62, 63, 64) are all about the same, the voltage across any resistor $V_{resistor}$ can be calculated using equation 16, where $V_{excitation}$ is the value of voltage supply 92.

$$V_{resistor} = \frac{1}{2} V_{excitation} \qquad \text{Equation 16}$$

Figure 5:
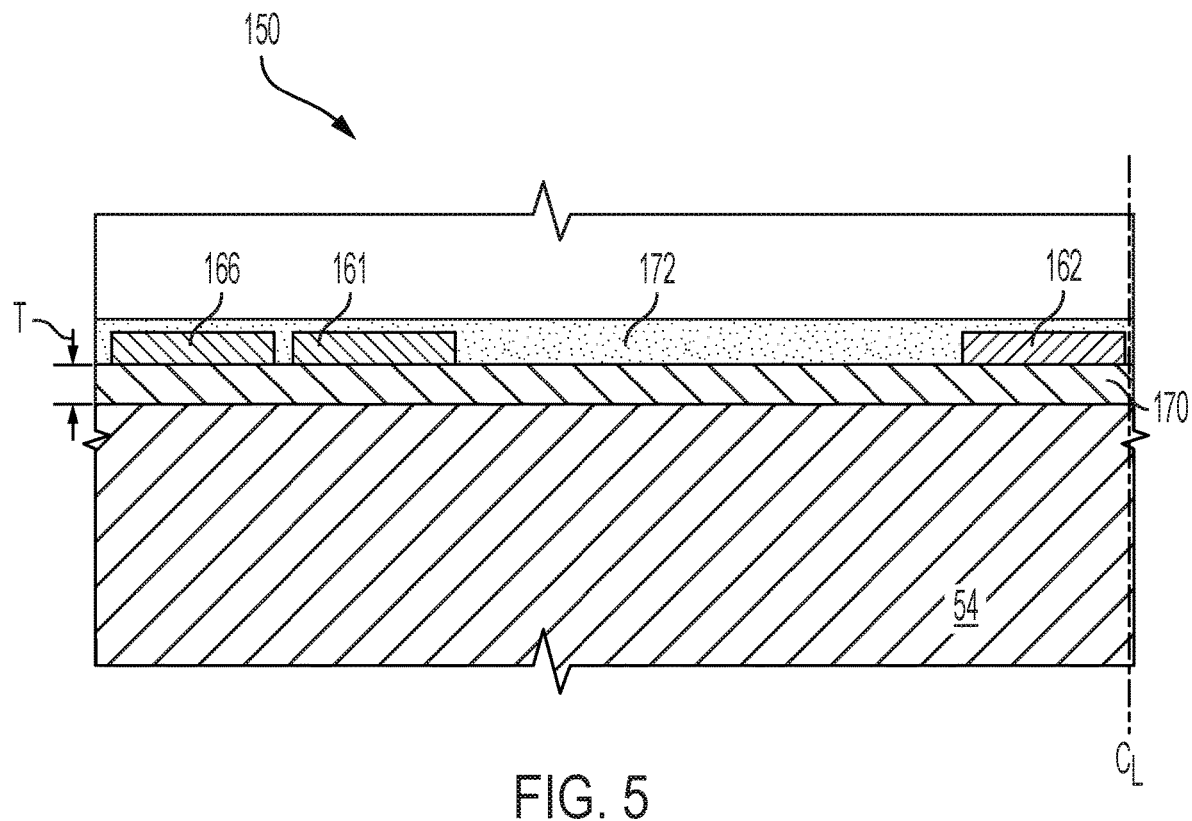
FIG. 5 is an enlarged cross-sectional side view of a second embodiment of a micromechanical pressure sensor with thermally-matched piezoresistive elements.

FIG. 5 is an enlarged cross-sectional side view showing a second embodiment of a micromechanical pressure sensor with thermally-matched piezoresistive elements. It is to be appreciated that the view of FIG. 5 is similar to that shown in FIG. 3C in which only half of the resistors of a Wheatstone bridge circuit are illustrated, with FIG. 5 depicting an enlarged portion of pressure sensor 150 (not shown in its entirety). Shown in FIG. 5 are pressure sensor 150, diaphragm 154, first resistor 161, second resistor 162, edge resistive element 166, isolation layer 170, and overcoat 172. Heat flow Q̇ is not depicted in FIG. 5, for ease of illustration. First and second resistors 161, 162 are used in a Wheatstone bridge circuit, as will be shown later in FIG. 6. The descriptions of diaphragm 154, isolation layer 170, and overcoat 172 is substantially similar to that provided above in regard to FIG. 3A. First and second resistors 161, 162 are piezoresistive elements, with first resistor 161 being an edge resistor and second resistor 162 being an inner resistor, as described above in regard to FIG. 3A. In the illustrated embodiment, the widths (not labeled) of first and second resistors 161, 162 are about equal to each other, and thermal matching is provided by edge resistive element 166, as will be described herein. During operation of pressure sensor 150, electrical current flows through edge resistive element 166, producing heat through power dissipation (i.e., self-heating) that overcomes the greater thermal loss from the edge resistor (i.e., first resistor 161) as compared to the inner resistor (i.e., second resistor 162). In an exemplary embodiment, edge resistive element 166 can be made of doped silicon, doped polysilicon, or various metals, with a non-limiting example being an alloy of nickel and chrome (e.g., NiCr).

Figure 6:
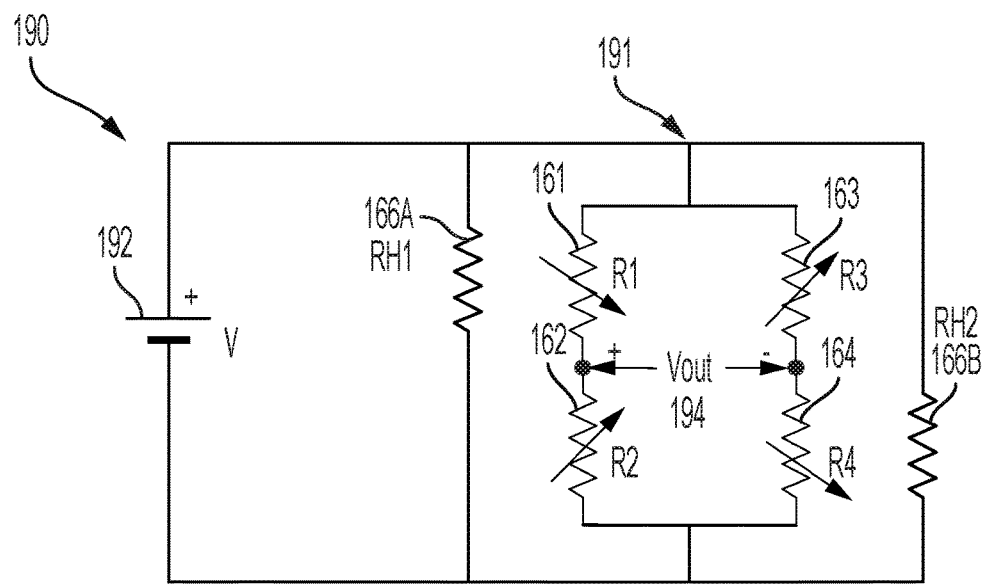
FIG. 6 is an electrical schematic diagram of a Wheatstone bridge circuit and associated circuitry for the micromechanical pressure sensor shown in FIG. 5.

FIG. 6 is an electrical schematic diagram of a Wheatstone bridge circuit and associated circuitry for pressure sensor 150 depicted in FIG. 5. Shown in FIG. 6 are first, second, third, and fourth resistor 161, 162, 163, 164, edge resistive elements 166A, 166B, bridge circuit 190, Wheatstone bridge 191, voltage supply 192, and output voltage 194. The descriptions of first, second, third, and fourth resistor 161, 162, 163, 164, Wheatstone bridge 191, voltage supply 192, and output voltage 194 is substantially similar to that provided above in regard to FIG. 4. In the illustrated embodiment, edge resistive elements 166A, 166B receive current flow from voltage supply 192, thereby producing heat (i.e., self-heating), as described above in regard to FIG. 5. The resistance value of edge resistive elements 166A, 166B can be selected to provide power dissipation that applies heat to respective first and fourth resistors 161, 164 (i.e., the edge resistors), thereby maintaining the temperature of the edge resistors at the temperature of the inner resistors (i.e., thermal matching). Edge resistive elements 166A, 166B can be referred to as edge heaters, or simply, as heaters. Accordingly, edge resistive heaters 166A, 166B are labeled as $R_{H1}$ and $R_{H2}$, respectively. In an exemplary embodiment, first, second, third, and fourth resistor 161, 162, 163, 164 each have a resistance value of about 700 Ω, and edge resistive elements 166A, 166B each have a resistance value of about 1100 Ω. In some embodiments, edge resistive elements 166A, 166B (i.e., heater resistors) can each have a resistance value that ranges from about 100-130,000 Ω. As noted above in regard to FIGS. 3A-3C and 4, first, second, third, and fourth resistors 161, 162, 163, 164 (i.e., bridge resistors) can each have a resistance value of can range from about 100-50,000 Ω (ohms). A ratio of heater resistor ($R_H$) resistance value to bridge resistor ($R_B$) resistance value can be defined as shown in equation 17.

$$\text{Heater } resistace \text{ ratio} = \frac{R_H}{R_B} \quad \text{Equation 17}$$

In the illustrated embodiment, the heater resistance ratio is about 1.57 (i.e., 1,100 Ω/700 Ω). In some embodiments, the heater resistance ratio can range from about 1-2.6. In other embodiments, the heater resistance ratio can be less than 1 or greater than 2.6. Several factors can be used in determining the value of heater resistance ratio in a particular embodiment, with exemplary factors being the value of voltage supply 192, particular geometries of the Wheatstone bridge resistors (i.e., first, second, third, fourth resistors 161, 162, 163, 164), the material used for the thermal insulator (i.e., isolation layer 170), the thickness of the thermal insulator (i.e., isolation layer thickness T), and the geometry of and material used for diaphragm 154 and sensor body 152.

Referring again to FIG. 5, the width of edge resistors (e.g., first resistor 161) and inner resistors (e.g., second resistor 162) are about the same. Accordingly, in some embodiments, thermal matching is provided in bridge circuit 190 by the selection of the resistance values of edge resistive elements 166A, 166B, without modifying the widths of the edge resistors relative to the inner resistors as described above in regard to FIGS. 3A-3C. In other embodiments, thermal matching can be partially provided in bridge circuit 190 by using edge resistive elements 166A, 166B, and partially by the setting of the resistor width ratio as described above in regard to FIGS. 3A-3C. In other words, the combined effects of edge resistive elements 166A, 166B and the resistor width ratio together provide thermal matching in the Wheatstone bridge resistors. In the illustrated embodiment, voltage supply 192 provides current flow through Wheatstone bridge 191 and edge resistive elements 166A, 166B. In some embodiments, a different voltage source (not shown) can provide current flow to edge resistive elements 166A, 166B. In any of these embodiments, the value of the voltage being supplied to edge resistive elements 166A, 166B can be adjusted to provide precise thermal matching in Wheatstone bridge 191 in pressure sensor 150.

Figure 7:
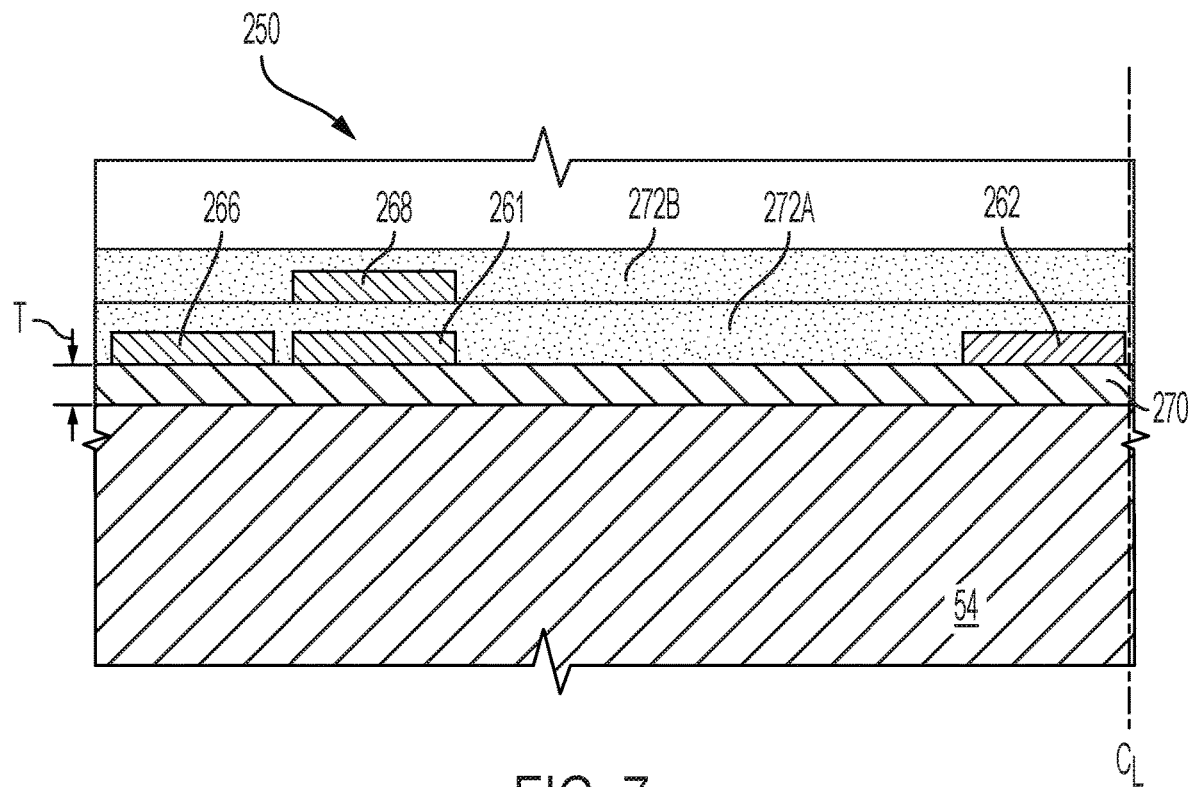
FIG. 7 is an enlarged cross-sectional side view of a third embodiment of a micromechanical pressure sensor with thermally-matched piezoresistive elements.

FIG. 7 is an enlarged cross-sectional side view of a third embodiment of a micromechanical pressure sensor with thermally-matched piezoresistive elements. Shown in FIG. 7 are pressure sensor 250, diaphragm 254, first resistor 261, second resistor 262, edge resistive element 266, vertically-offset resistive element 268, isolation layer 270, first overcoat 272A, and second overcoat 272B. Heat flow $\dot{Q}$ is not depicted in FIG. 5, for ease of illustration. The descriptions of diaphragm 254, first resistor 261, second resistor 262, and isolation layer 270 are substantially as provided above in regard to FIG. 5. The descriptions of first and second overcoat 272A, 272B are substantially as provided above in regard to FIG. 5, with second overcoat 272B being applied over first overcoat 272A as shown in FIG. 7. Edge resistive element 266 is used as a resistive heater, having a description substantially similar to that provided above in regard to FIG. 5. Vertically-offset resistive element 268 is used as a resistance temperature detector (RTD), having an electrical resistance value that varies with temperature. Accordingly, vertically-offset resistive element 268 can be used as a temperature sensor to measure temperature in the vicinity of first resistor 261. During the manufacturing of pressure sensor 250, first, second, third, and fourth resistors 261, 262, 263, 264 and edge resistive elements 266 can be deposited on isolation layer 270, and then first overcoat 272A can be applied. Next, vertically-offset resistive elements 268 can be deposited on first overcoat 272A, and then second overcoat 272B can be applied. It is to be appreciated that vertically-offset resistive elements 268 are so-named as a descriptive term with regard to the embodiment shown in FIG. 7, while not intending to limit the orientation of pressure sensor 50 to a particular orientation when used. Therefore, "vertically-offset" can be interpreted as being offset in a direction that is normal to the surface of diaphragm 270 (e.g., along the z-axis, normal to pressure surface 56 and/or resistor surface 58 as shown in FIG. 3A).

Figure 8:
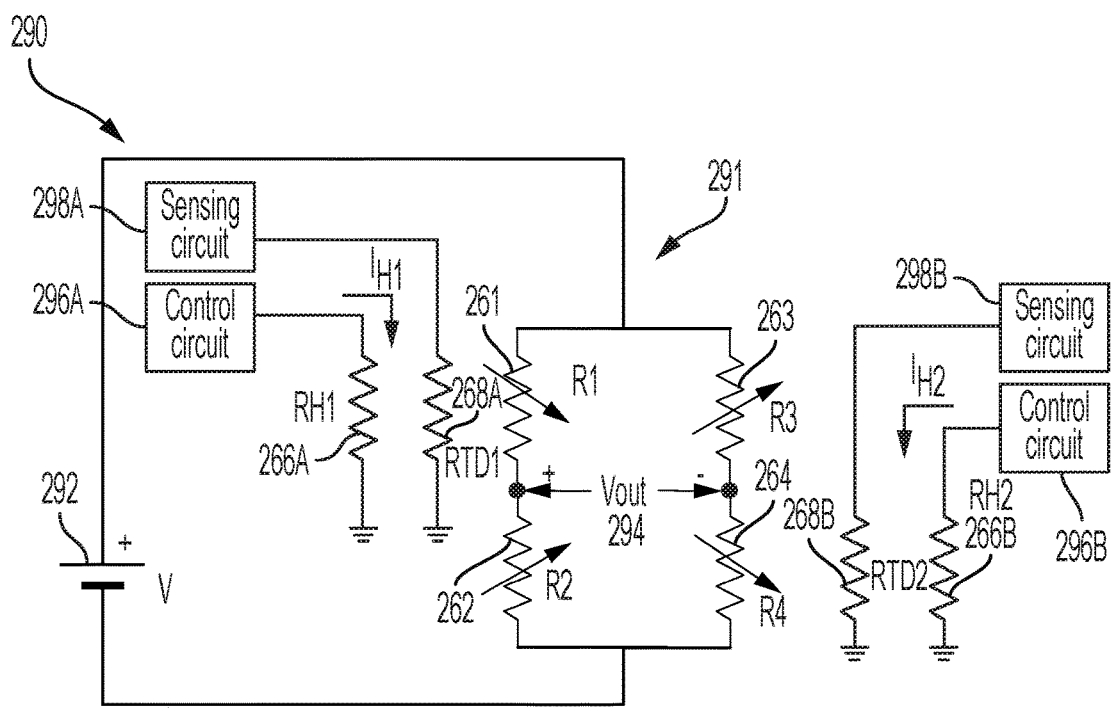
FIG. 8 is an electrical schematic diagram of a Wheatstone bridge circuit and associated circuitry for the micromechanical pressure sensor shown in FIG. 7.

FIG. 8 is an electrical schematic diagram of a Wheatstone bridge circuit and associated circuitry for pressure sensor 250 depicted in FIG. 7. Shown in FIG. 8 are first resistor 261, second resistor 262, third resistor 263, fourth resistor 264, edge resistive elements 266A, 266B, vertically-offset resistive elements 268A, 268B, bridge circuit 290, Wheatstone bridge 291, voltage supply 292, output voltage 294, control circuits 296A, 296B, and sensing circuits 298A, 298B. The descriptions of first, second, third, and fourth resistors 261, 262, 263, 264, Wheatstone bridge 291, voltage supply 292, and output voltage 294 are substantially similar to those provided above in regard to FIG. 6. In the illustrated embodiment, edge resistive element 266A is supplied current $I_{H1}$ from control circuit 296A, and edge resistive element 266B is supplied current $I_{H2}$ from control circuit 296B, thereby producing heat (i.e., self-heating) in edge resistive elements 266A, 266B. This provides thermal matching of the Wheatstone bridge resistors (i.e., first, second, third, and fourth resistors 261, 262, 263, 264), as described above in regard to FIGS. 6-7. Accordingly, edge resistive elements 266A, 266B are labeled as $R_{H1}$ and $R_{H2}$, respectively. Vertically offset resistive elements 268A, 266B, are used as RTDs, each providing a signal to sensing circuits 298A, 298B, respectively, representative of the temperature in the vicinity of first and fourth resistor 261, 264, respectively. During operation of bridge circuit 290, sensing circuits 298A, 298B each provide a signal (not shown in FIG. 8) to respective control circuits 296A, 296B, in turn directing each control circuit 296A, 296B to adjust the value of current flow $I_{H1}$, $I_{H2}$ through the respective edge resistive element 266A, 266B, as necessary to maintain a desired temperature in the vicinity of the respective edge resistor (i.e., first resistor 261, fourth resistor 264, respectively).

In some embodiments, vertically offset resistive elements 268, 268A, 268B can be configured to function as a heater, and edge resistive elements 266, 266A, 266B can be configured to function as a temperature detector (i.e., RTD). Accordingly, in these embodiments, the functionality of bridge circuit 290 will be functionally equivalent to that described in regard to FIGS. 7-8, except that the functions of edge resistive elements 266, 266A, 266B and vertically offset resistive elements 268, 268A, 266B will be transposed. Referring again to FIG. 7, it is to be appreciated that edge resistive element 266 and vertically offset resistive elements 268, as shown in FIG. 7, are together in close proximity to first resistor 261 (i.e., the edge resistor). Edge resistive element 266 and vertically offset resistive element 268 can each be referred to as secondary resistance devices (i.e., resistance devices in pressure sensor 250 that are in addition to the Wheatstone bridge resistors). Therefore, with regard to an edge resistor, one of the secondary resistance devices can be configured to produce heat when supplied by current, and the other secondary resistance device can be configured to sense temperature when connected to a sensing circuit.

In the illustrated embodiment shown in FIG. 8, each edge resistor (i.e., first resistor 261 and fourth resistor 264) had a separate associated control circuit 296A, 296B and sensing circuit 298A, 298B. In some embodiments, a single control circuit and/or sensing circuit can be used in bridge circuit 290, controlling currently flows $I_{H1}$, $I_{H2}$ together and/or sensing the temperature in the vicinity of edge resistors together. In these embodiments, it can be assumed, because of the electrical and physical symmetry of pressure sensor 250, that equivalent conditions will exist in each of the edge resistors (i.e., first resistor 261, fourth resistor 264). In other embodiments, edge resistive element 266 can be omitted from pressure sensor 250 and current can be supplied to vertically-offset resistive element 268, thereby providing power dissipation (i.e., self-heating) to thermally match the inner and edge resistors. In these other embodiments, pressure sensor 250 will be functionally similar to pressure sensor 150 shown and described above in FIGS. 5-6, whereby a single secondary resistance device (i.e., vertically-offset resistive element 268) is associated with each edge resistor (e.g., first resistor 261) to provide self-heating for thermally matching the Wheatstone bridge resistors.

Discussion of Possible Embodiments

The following are non-exclusive descriptions of possible embodiments of the present invention.

A micromechanical pressure sensor, comprising: a diaphragm, configured to mechanically deform in response to a load applied thereto, the diaphragm having an inner region and two edge regions, one distal the other with respect to the inner region; and two or more piezoresistive resistance devices disposed on the diaphragm, comprising: one or more piezoresistive resistance devices disposed in the inner region; and one or more piezoresistive resistance devices disposed in at least one of the edge regions; wherein: the two or more piezoresistive resistance devices are configured to be electrically connected in a bridge circuit; and the micromechanical pressure sensor is configured so that an operating temperature of the one or more piezoresistive resistance devices disposed in the inner region is substantially the same as an operating temperature of the one or more piezoresistive resistance devices disposed in at least one of the edge regions throughout a full operating range such that an error of the micromechanical pressure sensor output resulting from self-heating is less than if the micromechanical pressure sensor were not configured to maintain the operating temperatures substantially the same.

The micromechanical pressure sensor of the preceding paragraph can optionally include, additionally and/or alternatively, any one or more of the following features, configurations and/or additional components:

A further embodiment of the foregoing micromechanical pressure sensor, wherein: each of the one or more piezoresistive resistance devices disposed in the inner region defines an inner resistor width; each of the one or more piezoresistive resistance devices disposed in at least one of the edge regions defines an edge resistor width; a ratio of the edge resistor width to the inner resistor width defines a resistor width ratio; the resistor width ratio is less than 0.95; and the resistor width ratio is configured so that the operating temperature of the one or more piezoresistive resistance devices disposed in the inner region is substantially the same as the operating temperature of the one or more piezoresistive resistance devices disposed in at least one of the edge regions throughout the full operating range such that the error of the micromechanical pressure sensor output resulting from self-heating is less than if the micromechanical pressure sensor were not configured to maintain the operating temperatures substantially the same.

A further embodiment of the foregoing micromechanical pressure sensor, wherein the resistor width ratio ranges from 0.3-0.6.

A further embodiment of the foregoing micromechanical pressure sensor, wherein: each of the two or more piezoresistive resistance devices defines a static resistance value; the static resistance value of each of the two or more piezoresistive resistance devices is within 10% of a particular resistance value; and the static resistance value of each of the two or more piezoresistive resistance devices ranges from 100-50,000 ohms.

A further embodiment of the foregoing micromechanical pressure sensor, wherein: the bridge circuit is configured to be electrically connected to a voltage supply; and the voltage supply ranges from 0.1-100 volts.

A further embodiment of the foregoing micromechanical pressure sensor, wherein the voltage supply ranges from 3-50 volts.

A further embodiment of the foregoing micromechanical pressure sensor, further comprising an isolation layer, wherein: the isolation layer is disposed on the diaphragm; and the two or more piezoresistive resistance devices are disposed on the isolation layer.

A further embodiment of the foregoing micromechanical pressure sensor, wherein the isolation layer has a thickness that ranges from 0.1-5 µm.

A further embodiment of the foregoing micromechanical pressure sensor, wherein the two or more piezoresistive resistance devices comprise: four piezoresistive resistance devices disposed on the diaphragm, comprising: two piezoresistive resistance devices disposed in the inner region; and two piezoresistive resistance devices disposed in the edge regions; and wherein the four piezoresistive resistance devices are configured to be electrically connected in a Wheatstone bridge circuit.

A further embodiment of the foregoing micromechanical pressure sensor, further comprising one or more secondary resistance devices, wherein: the one or more secondary resistance devices are disposed in at least one of the edge regions, one proximate each of the one or more piezoresistive resistance devices disposed in at least one of the edge regions; and the one or more secondary resistance devices are configured to produce heat when electrical current is applied thereto, so that the operating temperature of the one or more piezoresistive resistance devices disposed in the inner region is substantially the same as the operating temperature of the one or more piezoresistive resistance devices disposed in the edge region throughout the full operating range such that the error of the micromechanical pressure sensor output resulting from self-heating is less than if the micromechanical pressure sensor were not configured to maintain the operating temperatures substantially the same.

A further embodiment of the foregoing micromechanical pressure sensor, wherein: each of the one or more secondary resistance devices defines a heater resistance value; the heater resistance value ranges from 100-130,000 ohms; each of the two or more piezoresistive resistance devices defines a static resistance value; and a ratio of the heater resistor value to the static resistance value ranges from 1-2.6.

A further embodiment of the foregoing micromechanical pressure sensor, further comprising two or more secondary resistance devices, wherein: a first one or more of the two or more secondary resistance devices are disposed in at least one of the edge regions, each configured to produce heat when an electrical heating current is applied thereto, one proximate each of the one or more piezoresistive resistance devices disposed in at least one of the edge regions; and a second one or more of the two or more secondary resistance devices are disposed in at least one of the edge regions, each configured to produce a resistance value representative of a sensed temperature, one proximate each of the one or more piezoresistive resistance devices disposed in at least one of the edge regions.

A further embodiment of the foregoing micromechanical pressure sensor, further comprising: one or more sensing circuits, each configured to sense the resistance value representative of a sensed temperature; and one or more control circuits, each configured to produce the electrical heating current representative of a desired temperature.

A further embodiment of the foregoing micromechanical pressure sensor, further comprising a first overcoat, wherein: the first overcoat covers the first one or more secondary resistance devices disposed in the edge region; and the second one or more secondary resistance devices is disposed on the first overcoat.

A method for using a micromechanical pressure sensor to measure a pressure differential across a diaphragm configured to mechanically deform in response to a load applied thereto by the pressure differential fluidly-communicated thereto, the diaphragm having an inner region and two edge regions, one edge region distal the other with respect to the inner region, the micromechanical pressure sensor comprising two or more piezoresistive resistance devices disposed on the diaphragm, the two or more piezoresistive resistance devices comprising one or more piezoresistive resistance devices disposed in the inner region each defining an inner resistor width and one or more piezoresistive resistance devices disposed in at least one of the edge regions each defining an edge resistor width, the two or more piezoresistive resistance devices configured to be electrically connected in a bridge circuit, the method comprising: applying a supply voltage to the bridge circuit, the bridge circuit configured to produce an electrical output voltage; measuring the electrical output voltage; and producing a signal representative of the pressure differential based on the measured electrical output voltage; wherein the micromechanical pressure sensor is configured so that an operating temperature of the one or more piezoresistive resistance devices disposed in the inner region is substantially the same as an operating temperature of the one or more piezoresistive resistance devices disposed in at least one of the edge regions throughout a full operating range such that an error of the micromechanical pressure sensor output resulting from self-heating is less than if the micromechanical pressure sensor were not configured to maintain the operating temperatures substantially the same.

The method of the preceding paragraph can optionally include, additionally and/or alternatively, any one or more of the following features, configurations and/or additional components:

A further embodiment of the foregoing method, wherein: a ratio of the edge resistor width to the inner resistor width defines a resistor width ratio; the resistor width ratio is less than 0.95; and the resistor width ratio is configured so that the operating temperature of the one or more piezoresistive resistance devices disposed in the inner region is substantially the same as the operating temperature of the one or more piezoresistive resistance devices disposed in at least one of the edge regions throughout the full operating range such that the error of the micromechanical pressure sensor output resulting from self-heating is less than if the micromechanical pressure sensor were not configured to maintain the operating temperatures substantially the same.

A further embodiment of the foregoing method, wherein: each of the one or more piezoresistive resistance devices disposed in the inner region and the one or more piezoresistive resistance devices disposed in at least one of the edge regions defines a static resistance value; the static resistance value of each of the one or more piezoresistive resistance devices disposed in the inner region and each of the one or more piezoresistive resistance devices disposed in at least one of the edge regions is within 10% of a particular resistance value; and the static resistance value of each of the one or more piezoresistive resistance devices disposed in the inner region and each of the one or more piezoresistive resistance devices disposed in at least one of the edge regions ranges from 100-50,000 ohms.

A further embodiment of the foregoing method, wherein: the micromechanical pressure sensor further comprises one or more secondary resistance devices; the one or more secondary resistance devices are disposed in at least one of the edge regions, one proximate each of the one or more piezoresistive resistance devices disposed in at least one of the edge regions; and the one or more secondary resistance devices are configured to produce heat when electrical current is applied thereto, so that the operating temperature of the one or more piezoresistive resistance devices disposed in the inner region is substantially the same as the operating temperature of the one or more piezoresistive resistance devices disposed in at least one of the edge regions throughout the full operating range such that the error of the micromechanical pressure sensor output resulting from self-heating is less than if the micromechanical pressure sensor were not configured to maintain the operating temperatures substantially the same.

A further embodiment of the foregoing method, wherein: each of the one or more secondary resistance devices defines a heater resistance value; the heater resistance value ranges from 100-130,000 ohms; each of the two or more piezoresistive resistance devices defines a static resistance value; a ratio of the heater resistor value to the static resistance value ranges from 1-2.6.

A further embodiment of the foregoing method, wherein the micromechanical pressure sensor further comprises: two or more secondary resistance devices, wherein: a first one or more of the two or more secondary resistance devices are disposed in at least one of the edge regions, each configured to produce heat when an electrical heating current is applied thereto, one proximate each of the one or more piezoresistive resistance devices disposed in at least one of the edge regions; and a second one or more of the two or more secondary resistance devices are disposed in at least one of the edge regions, each configured to produce a resistance value representative of a sensed temperature, one proximate each of the one or more piezoresistive resistance devices disposed in at least one of the edge regions; one or more sensing circuits, each configured to sense the resistance value representative of the sensed temperature; and one or more control circuits, each configured to produce the electrical heating current representative of a desired temperature.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A micromechanical pressure sensor, comprising:
a diaphragm, configured to mechanically deform in response to a load applied thereto, the diaphragm having an inner region and two edge regions, one distal the other with respect to the inner region; and
two or more piezoresistive resistance devices disposed on the diaphragm, comprising:
one or more piezoresistive resistance devices disposed in the inner region; and
one or more piezoresistive resistance devices disposed in at least one of the edge regions;
wherein:
the two or more piezoresistive resistance devices are configured to be electrically connected in a bridge circuit;
the micromechanical pressure sensor is configured so that an operating temperature of the one or more piezoresistive resistance devices disposed in the inner region is substantially the same as an operating temperature of the one or more piezoresistive resistance devices disposed in at least one of the edge regions throughout a full operating range such that an error of the micromechanical pressure sensor output resulting from self-heating is less than if the micromechanical pressure sensor were not configured to maintain the operating temperatures substantially the same;
each of the one or more piezoresistive resistance devices disposed in the inner region defines an inner resistor width;
each of the one or more piezoresistive resistance devices disposed in at least one of the edge regions defines an edge resistor width;
a ratio of the edge resistor width to the inner resistor width defines a resistor width ratio;
the resistor width ratio is less than 0.95; and
the resistor width ratio is configured so that the operating temperature of the one or more piezoresistive resistance devices disposed in the inner region is substantially the same as the operating temperature of the one or more piezoresistive resistance devices disposed in at least one of the edge regions throughout the full operating range such that the error of the micromechanical pressure sensor output resulting from self-heating is less than if the micromechanical pressure sensor were not configured to maintain the operating temperatures substantially the same.

2. The micromechanical pressure sensor of claim 1, wherein the resistor width ratio ranges from 0.3-0.6.

3. The micromechanical pressure sensor of claim 1, wherein:
each of the two or more piezoresistive resistance devices defines a static resistance value;
the static resistance value of each of the two or more piezoresistive resistance devices is within 10% of a particular resistance value; and
the static resistance value of each of the two or more piezoresistive resistance devices ranges from 100-50,000 ohms.

4. The micromechanical pressure sensor of claim 1, wherein:
the bridge circuit is configured to be electrically connected to a voltage supply; and
the voltage supply ranges from 0.1-100 volts.

5. The micromechanical pressure sensor of claim 4, wherein the voltage supply ranges from 3-50 volts.

6. The micromechanical pressure sensor of claim 1, further comprising an isolation layer, wherein:
the isolation layer is disposed on the diaphragm; and
the two or more piezoresistive resistance devices are disposed on the isolation layer.

7. The micromechanical pressure sensor of claim 6, wherein the isolation layer has a thickness that ranges from 0.1-5 μm.

8. The micromechanical pressure sensor of claim 1, wherein the two or more piezoresistive resistance devices comprise:
four piezoresistive resistance devices disposed on the diaphragm, comprising:
two piezoresistive resistance devices disposed in the inner region; and two piezoresistive resistance devices disposed in the edge regions; and wherein the four piezoresistive resistance devices are configured to be electrically connected in a Wheatstone bridge circuit.

9. The micromechanical pressure sensor of claim 1, further comprising one or more secondary resistance devices, wherein:
the one or more secondary resistance devices are disposed in at least one of the edge regions, one proximate each of the one or more piezoresistive resistance devices disposed in at least one of the edge regions; and
the one or more secondary resistance devices are configured to produce heat when electrical current is applied thereto, so that the operating temperature of the one or more piezoresistive resistance devices disposed in the inner region is substantially the same as the operating temperature of the one or more piezoresistive resistance devices disposed in the edge region throughout the full operating range such that the error of the micromechanical pressure sensor output resulting from self-heating is less than if the micromechanical pressure sensor were not configured to maintain the operating temperatures substantially the same.

10. The micromechanical pressure sensor of claim 9, wherein:
each of the one or more secondary resistance devices defines a heater resistance value;
the heater resistance value ranges from 100-130,000 ohms;
each of the two or more piezoresistive resistance devices defines a static resistance value; and
a ratio of the heater resistor value to the static resistance value ranges from 1-2.6.

11. The micromechanical pressure sensor of claim 1, further comprising two or more secondary resistance devices, wherein:
a first one or more of the two or more secondary resistance devices are disposed in at least one of the edge regions, each configured to produce heat when an electrical heating current is applied thereto, one proximate each of the one or more piezoresistive resistance devices disposed in at least one of the edge regions; and
a second one or more of the two or more secondary resistance devices are disposed in at least one of the edge regions, each configured to produce a resistance value representative of a sensed temperature, one proximate each of the one or more piezoresistive resistance devices disposed in at least one of the edge regions.

12. The micromechanical pressure sensor of claim 11, further comprising:
one or more sensing circuits, each configured to sense the resistance value representative of a sensed temperature; and
one or more control circuits, each configured to produce the electrical heating current representative of a desired temperature.

13. The micromechanical pressure sensor of claim 11, further comprising a first overcoat, wherein:
the first overcoat covers the first one or more secondary resistance devices disposed in the edge region; and
the second one or more secondary resistance devices is disposed on the first overcoat.

14. A method for using a micromechanical pressure sensor to measure a pressure differential across a diaphragm configured to mechanically deform in response to a load applied thereto by the pressure differential fluidly-communicated thereto, the diaphragm having an inner region and two edge regions, one edge region distal the other with respect to the inner region, the micromechanical pressure sensor comprising two or more piezoresistive resistance devices disposed on the diaphragm, the two or more piezoresistive resistance devices comprising one or more piezoresistive resistance devices disposed in the inner region each defining an inner resistor width and one or more piezoresistive resistance devices disposed in at least one of the edge regions each defining an edge resistor width, the two or more piezoresistive resistance devices configured to be electrically connected in a bridge circuit, the method comprising:
applying a supply voltage to the bridge circuit, the bridge circuit configured to produce an electrical output voltage;
measuring the electrical output voltage; and
producing a signal representative of the pressure differential based on the measured electrical output voltage;
wherein:
the micromechanical pressure sensor is configured so that an operating temperature of the one or more piezoresistive resistance devices disposed in the inner region is substantially the same as an operating temperature of the one or more piezoresistive resistance devices disposed in at least one of the edge regions throughout a full operating range such that an error of the micromechanical pressure sensor output resulting from self-heating is less than if the micromechanical pressure sensor were not configured to maintain the operating temperatures substantially the same,
each of the one or more piezoresistive resistance devices disposed in the inner region and the one or more piezoresistive resistance devices disposed in at least one of the edge regions defines a static resistance value;
the static resistance value of each of the one or more piezoresistive resistance devices disposed in the inner region and each of the one or more piezoresistive resistance devices disposed in at least one of the edge regions is within 10% of a particular resistance value; and
the static resistance value of each of the one or more piezoresistive resistance devices disposed in the inner region and each of the one or more piezoresistive resistance devices disposed in at least one of the edge regions ranges from 100-50,000 ohms.

15. The method of claim 14, wherein:
a ratio of the edge resistor width to the inner resistor width defines a resistor width ratio;
the resistor width ratio is less than 0.95; and
the resistor width ratio is configured so that the operating temperature of the one or more piezoresistive resistance devices disposed in the inner region is substantially the same as the operating temperature of the one or more piezoresistive resistance devices disposed in at least one of the edge regions throughout the full operating range such that the error of the micromechanical pressure sensor output resulting from self-heating is less than if the micromechanical pressure sensor were not configured to maintain the operating temperatures substantially the same.

16. The method of claim 14, wherein:
the micromechanical pressure sensor further comprises one or more secondary resistance devices;
the one or more secondary resistance devices are disposed in at least one of the edge regions, one proximate each of the one or more piezoresistive resistance devices disposed in at least one of the edge regions; and
the one or more secondary resistance devices are configured to produce heat when electrical current is applied thereto, so that the operating temperature of the one or more piezoresistive resistance devices disposed in the inner region is substantially the same as the operating temperature of the one or more piezoresistive resistance devices disposed in at least one of the edge regions throughout the full operating range such that the error of the micromechanical pressure sensor output resulting from self-heating is less than if the micromechanical pressure sensor were not configured to maintain the operating temperatures substantially the same.

17. The method of claim 16, wherein:
each of the one or more secondary resistance devices defines a heater resistance value;
the heater resistance value ranges from 100-130,000 ohms;
each of the two or more piezoresistive resistance devices defines a static resistance value;
a ratio of the heater resistor value to the static resistance value ranges from 1-2.6.

18. The method of claim 14, wherein the micromechanical pressure sensor further comprises:
two or more secondary resistance devices, wherein:
a first one or more of the two or more secondary resistance devices are disposed in at least one of the edge regions, each configured to produce heat when an electrical heating current is applied thereto, one proximate each of the one or more piezoresistive resistance devices disposed in at least one of the edge regions; and
a second one or more of the two or more secondary resistance devices are disposed in at least one of the edge regions, each configured to produce a resistance value representative of a sensed temperature, one proximate each of the one or more piezoresistive resistance devices disposed in at least one of the edge regions;
one or more sensing circuits, each configured to sense the resistance value representative of the sensed temperature; and
one or more control circuits, each configured to produce the electrical heating current representative of a desired temperature.

\* \* \* \* \*